United States Patent
Luo et al.

(10) Patent No.: US 11,188,315 B1
(45) Date of Patent: Nov. 30, 2021

(54) METHOD AND APPARATUS FOR REUSABLE AND RELATIVE INDEXED REGISTER RESOURCE ALLOCATION IN FUNCTION CALLS

(71) Applicant: HUAWEI TECHNOLOGIES CO., LTD., Guangdong (CN)

(72) Inventors: Yan Luo, Markham (CA); Ahmed Mohammed ElShafiey Mohammed Eltantawy, Markham (CA); Tyler Bryce Nowicki, Mississauga (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/012,203

(22) Filed: Sep. 4, 2020

(51) Int. Cl.
*G06F 8/41* (2018.01)
(52) U.S. Cl.
CPC ................... *G06F 8/4441* (2013.01)
(58) Field of Classification Search
CPC ...... G06F 8/443; G06F 8/4442; G06F 8/4443; G06F 8/4441
See application file for complete search history.

(56) References Cited

U.S. PATENT DOCUMENTS

| | | | |
|---|---|---|---|
| 7,207,032 B1 | 4/2007 | Verbitsky | |
| 2004/0237074 A1* | 11/2004 | Aronson | G06T 15/005 717/158 |
| 2015/0205590 A1* | 7/2015 | Sabne | G06F 8/456 717/150 |
| 2017/0061569 A1* | 3/2017 | Sathe | G06T 1/60 |
| 2018/0024820 A1* | 1/2018 | Davis | G06F 8/443 717/155 |

FOREIGN PATENT DOCUMENTS

| | | |
|---|---|---|
| CN | 102221994 A | 10/2011 |
| CN | 103959257 A | 7/2014 |
| WO | 2013112282 A1 | 8/2013 |

OTHER PUBLICATIONS

Brian Guenter, Specializing Shaders, Aug. 1995, Published by Association for Computing Machinery, Inc. (Year: 1995).*
Caldwell et al., "Reducing calling convention overhead in object-oriented programming on embedded ARM thumb-2 platforms", GPCE 2017, Oct. 2017, Vancouver, Canada.
(Continued)

*Primary Examiner* — Wei Y Zhen
*Assistant Examiner* — Amir Soltanzadeh
(74) *Attorney, Agent, or Firm* — BCF LLP

(57) ABSTRACT

The disclosed systems, apparatuses and methods are directed to optimizing by a compiler register resource allocation for functions of a module, using a Register File comprising a limited number of registers. After performing interprocedural analysis in the module, the compiler computes the number of registers used by each function, and compiles the function to final machine code, except at callsites where a call is detected to be made to another function. At each callsite and for each called function, the compiler expands call instructions to final machine code after computing and setting a relative index to be used by a called function for running in an available part of the Register File. The relative index optimizes register resource allocation by minimizing the number of spilled registers before a function is called.

17 Claims, 5 Drawing Sheets

(56) References Cited

OTHER PUBLICATIONS

Olinsky et al., "Staged allocation: a compositional technique for specifying and implementing procedure calling conventions", ACM SIGPLAN Notices, Jan. 2006, Charleston, South Carolina, USA.
Postiff, "Compiler and Microarchitecture Mechanisms for Exploiting Registers to Improve Memory Performance, PhD dissertation", Jun. 2001, University of Michigan.
Charu et al., "Apple LLVM GPU Compiler: Embedded Dragons, 2017 US LLVM Developer's Meeting", Oct. 2017.
International Search Report issued in co-pending International application No. PCT/CN2021/094790 dated Jul. 30, 2021.

* cited by examiner

METHOD AND APPARATUS FOR REUSABLE AND RELATIVE INDEXED REGISTER RESOURCE ALLOCATION IN FUNCTION CALLS

FIELD

The present disclosure generally relates to the field of register resource optimization, in particular, to a method and apparatus for optimizing allocation of such resource in function calls.

BACKGROUND

Processors often have general purpose registers or register file, shared by processing threads and partitioned at runtime. These resources provide memory capabilities with very fast access to and from the processor, in a limited quantity owing to the hardware cost of such resources. Processors also use cheaper memory resources, such as caches and main memory, in much larger quantities, but also much slower read/write performances. Exhaustion of register resources while processing imposes on the processor to spill values held in registers to caches and/or main memory. Such spill imposes a high penalty on processing, and is very expensive in terms of both performance and energy, and thus highly inefficient.

For function calls, a regular calling convention would typically require caller and callee spilling live registers to stack, and restoring them after return from callee. Such regular calling conventions require determining how many registers need to be saved for caller, how many registers need to be passed on to the callee, leading to partitioning the available register file, and involving large spilling over to other memory resources.

This may lead to under-utilization of the register file (i.e., although there is enough registers to hold both caller and callee live data, data are stored/loaded to/from stack). Besides, processor programming typically uses inlining when possible (with a large main function and small called functions).

As an example, a particular computing environment may exacerbate this problem: that of raytracing processing with a Graphical Processing Unit (GPU), where shader pipelines make interactions between shaders more dynamic. Shader can call other shaders, much like indirect method invocation in procedural programming. In this computing environment, inlining may not even be a possibility.

Typically, all function/shader register resource allocation requests are resolved and finalized at compile time. They are encoded in the resulting binary and therefore register resource assignments are immutable once compilation completes. Indirect function invocations make it desirable for register resource allocation to be dynamic between function/shader caller and callee.

SUMMARY

The present technology provides a register allocation scheme for callees to "reuse" free register resources at Callsite (a base class of dynamic calling), such allocation scheme being "relative" to the caller. More particularly, the present technology allows for a compiler to perform optimized, dynamic register resource allocation in calls, in particular indirect ones. It provides for optimizing register resource allocations e.g. register allocations in calls using dynamic resource reuse and dynamically indexed resource accesses. It proposes a new mechanism to manage and optimize register resource allocations at runtime based on actual resource usage analysis for each Callsite at compile time, resulting in more efficient resource utilization and reducing probability of spill operation due to register file resource exhaustion. It provides a compiler with the capability to optimize runtime code that anticipates and handles register resource exhaustion, with a recourse to spilling only when such resource is actually about to be depleted.

The present technology enables compiler to perform register resource dataflow analysis to find resource reuse pattern at each Callsite. Based on the analysis, compiler creates a customized allocation map and allocation pointer for callee to consume, realizing an optimized and dynamic allocation scheme among caller and callee(s).

It also proposes dynamic relative register resource access mechanism to facilitate the allocation scheme, which enables compiler to flexibly generate one copy of compiled code for different allocation scenarios at runtime.

An objective of the present technology is therefore to provide a technique for optimizing the use of a register file by functions, by exploiting the availability of free registers so as to avoid having to spill values held in registers to much slower caches and/or main memory. The apparatuses, methods and systems as disclosed herein permit a compiler to, after analyzing call interactions between functions, pass on to called functions relative indexes allowing such functions to use free registers in the register file before having to spill values from registers.

In accordance with this objective, an aspect of the present technology provides a method for optimizing by a compiler register resource allocation for a function $S_i$ of a module, i>0, using a Register File comprising a number of registers, $\text{Nof\_reg}_{file}$. The method comprises performing interprocedural analysis in the module, and (i) computing the number of registers used by the function $S_i$, $\text{Nof\_reg}_i$, and (ii) compiling the function $S_i$ to final machine code, wherein if the compiler detects a call j, j<>i, to another function $S_j$, the compiler leaves the call instructions as pseudo instructions, $\text{Callsite}_{ij}$. The method further comprises for each $\text{Callsite}_{ij}$, (i) determining one or several called functions $S_k$, k<>i, as $\text{Calltarget}_{ijk}$, and (ii) computing a maximum number of live registers used by function $S_i$ at the $\text{Callsite}_{ij}$, $\text{maxRegIndex}_{ij}$, and computing $\text{RegIndexForRelIndex}_{ij}=\text{maxRegIndex}_{ij}+1$. The method further comprises yet for each $\text{Callsite}_{ij}$ and each $\text{Calltarget}_{ijk}$, expanding the call instructions to final machine code toward (i) reading the value of a relative index $\text{Rel\_Index}_i$ for the function $S_i$, and computing a sum of $\text{Rel\_Index}_i+\text{RegIndexForRelIndex}_{ij}+\text{Nof\_reg}_k$ for the function $\text{Calltarget}_{ijk}$, and (ii) comparing the computed sum to $\text{Nof\_reg}_{file}$, wherein: if the computed sum is less than, or equal to $\text{Nof\_reg}_{file}$, computing and setting a relative index $\text{Rel\_Index}_{ijk}$ that is passed on to each $\text{Calltarget}_{ijk}$ at $\text{Callsite}_{ij}$ to be used by $\text{Calltarget}_{ijk}$ as register offset for running using an available part of the Register File; otherwise computing and spilling registers from the Register File, and computing and setting an associated relative index $\text{Rel\_Index}_{ijk}$ that accounts for the spilled registers, and that is passed on to each $\text{Calltarget}_{ijk}$ at $\text{Callsite}_{ij}$ to be used by $\text{Calltarget}_{ijk}$ as register offset for running using an available part of the Register File; and repeating the computing, compiling, determining, computing, reading, comparing, computing and spilling and setting for all functions Si of the module.

In some embodiments of the method, functions $S_i$ are shader functions performing raytracing in a Graphical Processing Unit, GPU.

In some other embodiments of the method, the performing interprocedural analysis in the module involves an analysis of at least one of (i) caller-callee relationships between functions $S_i$, or (ii) function $S_k$ call target information.

In some other embodiments of the method, the compiler uses profiling information in addition to performing interprocedural analysis.

In some other embodiments of the method, the relative index $Rel\_Index_{ijk}$ is passed on by writing it to a register R0 of the $Calltarget_{ijk}$.

In some other embodiments of the method, the relative index $Rel\_Index_{ijk}$ is passed on to the $Calltarget_{ijk}$ by writing it in a processor register that is not part of the Register File, and fetching it in such register by the $Calltarget_{ijk}$.

In some other embodiments of the method, when performing interprocedural analysis in the module involves an analysis of caller-callee relationships between functions $S_i$, the computing the number of registers $Nof\_reg_i$ used by the functions $S_i$ is performed by (i) computing $Nof\_reg_i$ for each leaf function among the functions $S_i$, and (ii) for each leaf function, iteratively computing $Nof\_reg_i$ for each function moving up the call chain among the functions $S_i$ that are in a caller-callee relationship with the leaf function.

In some other embodiments of the method, when performing interprocedural analysis in the module involves an analysis of function $S_k$ call target information, the computing the number of registers $Nof\_reg_i$ used by the functions $S_i$ is performed on demand, and if the call target information for a Callsiteij is unknown, compiler returns $Nof\_reg_i$ as $Nof\_reg_{file}$.

In some other embodiments of the method, the computing and setting a relative index $Rel\_Index_{ijk}$ that is passed on to each $Calltarget_{ijk}$ at $Callsite_{ij}$ in the case the computed sum is less than, or equal to $Nof\_reg_{file}$, comprises expanding the call instructions to final machine code toward (i) computing: $Rel\_Index_{ijk}$=R0+$RegIndexForRelIndex_{ijk}$, where R0 holds the $Rel\_Index_i$ for function $S_i$, (ii) storing the value $Rel\_Index_{ijk}$, in register indexed at $RegIndexForRelIndex_{ij}$, $R_{RegIndexForRelIndexij}$, (iii) setting: $Rel\_index_k$=$R_{RegIndexForRelIndexij}$, (iv) calling $S_k$, (v) computing: R0=R0−$R_{RegIndexForRelIndexij}$, and (vi) setting: $Rel\_index_i$=R0.

In some other embodiments of the method, the computing and setting a relative index $Rel\_Index_{ijk}$ that is passed on to each $Calltarget_{ijk}$ at $Callsite_{ij}$ in the case the computed sum is more than $Nof\_reg_{file}$, comprises expanding the call instructions to final machine code toward (i) computing a number of registers to spill $NSpill_{ij}$ from the Register File: $NSpill_{ij}$=($Nof\_reg_{file}$−(R0+$RegIndexForRelIndex_{ij}$+$Nof\_reg_k$), (ii) setting: $Rel\_index_i$=$Rel\_index_{ijk}$, (iii) spilling registers R0 to $R_{NSpillij-1}$, (iv) storing $Rel\_index_{ijk}$ in R0, and ($RegIndexForRelIndex_{ij}$−$NSpill_{ij}$) in R1, (v) calling $S_k$, (vi) computing: $R_{free}$=R0+R1, and storing $R_{free}$ in a register other than R0 or R1, (vi) unspilling registers R0 to $R_{NSpillij-1}$, and (vii) setting: Set $Rel\_index_i$=$R_{free}$.

In accordance with this objective, a further aspect of the present technology provides an apparatus comprising a processor, a Register File comprising a number of registers, $Nof\_reg_{file}$, and a Memory, the processor running a compiler configured to compile a module comprising functions S to processor executable instructions, wherein the compiler is further configured to optimize register resource allocation for a function $S_i$ of the module, i>0, the optimizing comprising: performing interprocedural analysis in the module, and (i) computing the number of registers used by the function $S_i$, $Nof\_reg_i$, and (ii) compiling the function $S_i$ to processor executable instructions. The optimizing further comprises, if the compiler detects a call j, j< >i, to another function $S_i$, leaving the call instructions as pseudo instructions, $Callsite_{ij}$, and for each $Callsite_{ij}$, (i) determining one or several called functions $S_k$, k< >i, as $Calltarget_{ijk}$, and (ii) computing a maximum number of live registers used by function $S_i$ at the $Callsite_{ij}$, $maxRegIndex_{ij}$, and computing $RegIndexForRelIndex_{ij}$=$maxRegIndex_{ij}$+1. The optimizing further comprises for each $Callsite_{ij}$ and each $Calltarget_{ijk}$, expanding the call instructions to processor executable instructions toward (i) reading the value of a relative index $Rel\_Index_i$ for the function $S_i$, and computing a sum of $Rel\_Index_i$+$RegIndexForRelIndex_{ij}$+$Nof\_reg_k$ for the function $Calltarget_{ijk}$, and (ii) comparing the computed sum to $Nof\_reg_{file}$, wherein if the computed sum is less than, or equal to $Nof\_reg_{file}$, computing and setting a relative index $Rel\_Index_{ijk}$ that is passed on to each $Calltarget_{ijk}$ at $Callsite_{ij}$ to be used by $Calltarget_{ijk}$ as register offset for running using an available part of the Register File, and otherwise computing and spilling registers from the Register File to the Memory, and computing and setting an associated relative index $Rel\_Index_{ijk}$ that accounts for the spilled registers, and that is passed on to each $Calltarget_{ijk}$ at $Callsite_{ij}$ to be used by $Calltarget_{ijk}$ as register offset for running using an available part of the Register File. The computing, compiling, determining, computing, reading, comparing, computing and spilling and setting are repeated for all functions $S_i$ of the module.

In some embodiments of the apparatus, the processor is a Graphical Processing Unit, GPU, and the functions $S_i$ are shader functions performing raytracing.

In some other embodiments of the apparatus, the relative index $Rel\_Index_{ijk}$ is passed on by writing it to a register R0 of the $Calltarget_{ijk}$.

In some other embodiments of the apparatus, the relative index $Rel\_Index_{ijk}$ is passed on to the $Calltarget_{ijk}$ by writing it in a register in the processor that is not part of the Register File, and fetching it in such register by the $Calltarget_{ijk}$.

In accordance with this objective, a further aspect of the present technology provides a non-transitory computer readable medium with computer executable instructions stored thereon that, when executed by a processor, cause the processor to optimize register resource allocation for a function $S_i$ of a module, i>0, using a Register File comprising a number of registers, $Nof\_reg_{file}$, the optimizing comprising performing interprocedural analysis in the module, and (i) computing the number of registers used by the function $S_i$, $Nof\_reg_i$, and (ii) compiling the function $S_i$ to final machine code, wherein if the compiler detects a call j, j< >i, to another function $S_i$, the compiler leaves the call instructions as pseudo instructions, $Callsite_{ij}$. The optimizing further comprises for each $Callsite_{ij}$, (i) determining one or several called functions $S_k$, k< >i, as $Calltarget_{ijk}$, and (ii) computing a maximum number of live registers used by function $S_i$ at the $Callsite_{ij}$, $maxRegIndex_{ij}$, and computing $RegIndexForRelIndex_{ij}$=$maxRegIndex_{ij}$+1. The optimizing further comprises yet for each $Callsite_{ij}$ and each $Calltarget_{ijk}$, expanding the call instructions to final machine code toward (i) reading the value of a relative index $Rel\_Index_i$ for the function $S_i$, and computing a sum of $Rel\_Index_i$+$RegIndexForRelIndex_{ij}$+$Nof\_reg_k$ for the function $Calltarget_{ijk}$, and (ii) comparing the computed sum to $Nof\_reg_{file}$, wherein: if the computed sum is less than, or equal to $Nof\_reg_{file}$, computing and setting a relative index $Rel\_Index_{ijk}$ that is passed on to each $Calltarget_{ijk}$ at $Callsite_{ij}$ to be used by $Calltarget_{ijk}$ as register offset for running using an available part of the Register File; otherwise computing and spilling registers from the Register File, and computing and setting an associated relative index $Rel\_Index_{ijk}$ that accounts for the spilled registers, and that is passed on to each $Calltarget_{ijk}$ at $Callsite_{ij}$ to be used by $Calltarget_{ijk}$ as register offset for running using an available part of the Register File; and repeating the computing, compiling, determining, computing, reading, comparing, computing and spilling and setting for all functions Si of the module.

In some embodiments of the non-transitory computer readable medium with computer executable instructions stored thereon, the performing interprocedural analysis in the module involves an analysis of at least one of (i) caller-callee relationships between functions $S_i$, or (ii) function $S_k$ call target information.

In yet some other embodiments of the non-transitory computer readable medium with computer executable instructions stored thereon, the compiler uses profiling information in addition to performing interprocedural analysis.

In the context of the present description, the expression "processor" in intended to include a single dedicated processor, a single shared processor, or a plurality of individual processors, some of which may be shared. In some aspects of the present technology, the processor may be for example a general purpose processor, such as a Central Processing Unit (CPU), a processor dedicated to a specific purpose, such as a GPU, or a processor implemented in a FPGA. Other hardware, conventional and/or custom, may also be included.

BRIEF DESCRIPTION OF THE FIGURES

The features and advantages of the present disclosure will become apparent from the following detailed description, taken in combination with the appended drawings, in which.

Figure 1:
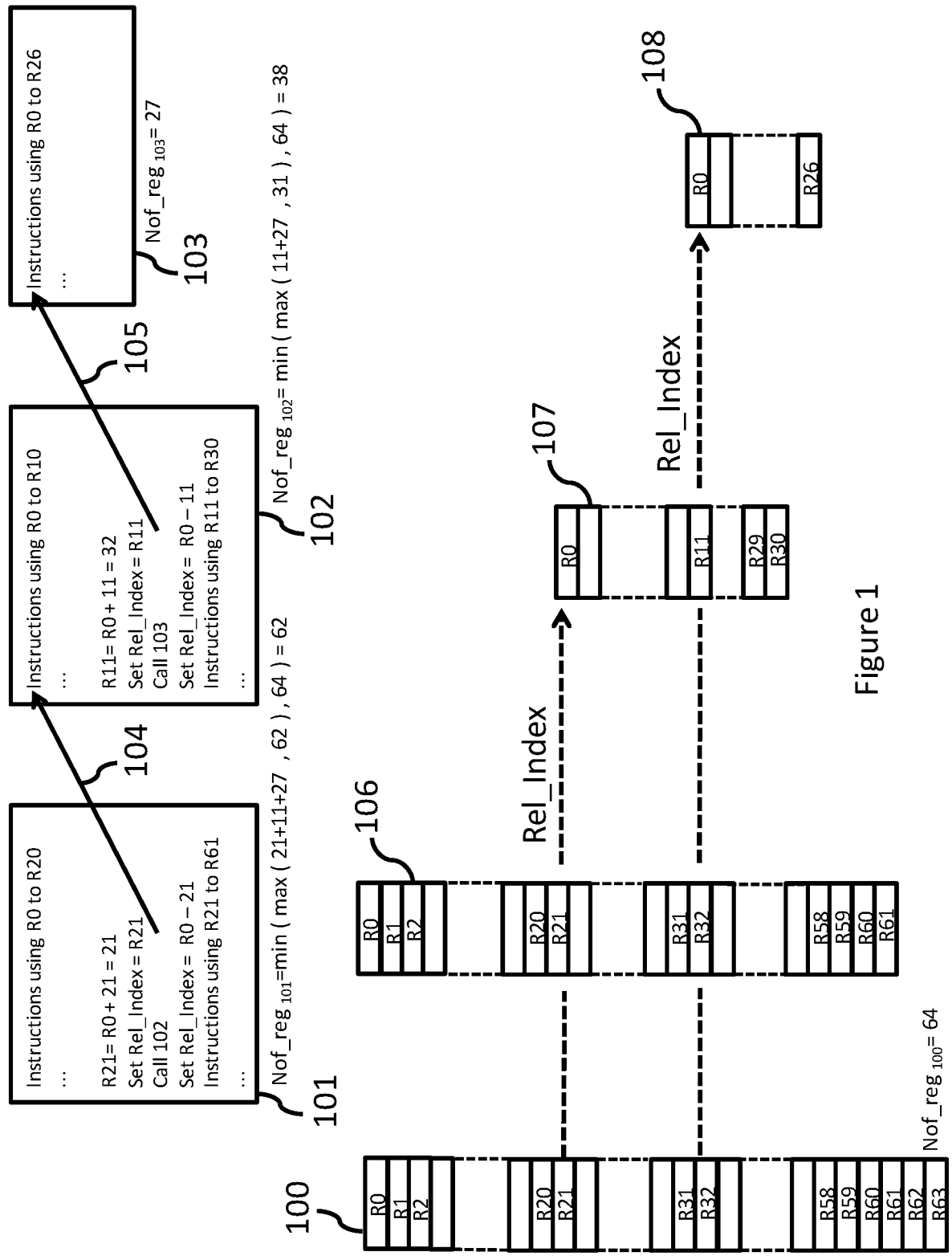
FIG. 1 illustrates a call between functions which may be optimized with the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The present technology is being described in a general computing environment context, yet it will be appreciated by the person skilled in the art that the teachings herein are also applicable to particular computing environments, such as that of raytracing and shader callers and callees in a GPU, as a method and system for optimizing register resource allocation in function calls using dynamic relative indexing and reuse of such resources.

For a processing function being compiled, e.g. a called function (callee), an allocation map and an allocation pointer may be consulted to look up reusable register resources from up the call chain. To access register resources within the compilation body, relative indexing of resources may be used, with the base index dynamically set depending on the allocation map and allocation pointer passed in at the Callsite. "Function" herein defines a software processing element comprising instructions, and forming of a module or a library of functions, in which "interprocedural analysis" by a compiler allows to determine the caller/callee relationships in direct calls, and, for indirect calls and a given caller, a view of possible callees with associated likelihood or % of being called. In particular embodiments of the technology, profiling information may also be used in addition to interprocedural analysis. "Call", "called" or "calling" herein is used interchangeably for respectively "invoke", "invoked" or "invoking", to refer to the action of causing a program, a function, a routine, etc. to execute, without technical differences that affect the generality of the teachings herein.

Runtime code may be generated at each Callsite to check for register resource exhaustion and minimal amount of instructions are executed for the necessary spill/unspill operations. If the compiling function invokes other functions, data flow analysis may be performed to determine potential reusable register resources at each Callsite. The largest consecutively free indexed resource may be determined, which forms the allocation map that may be passed to the called function (callee). The callee may be compiled using the same mechanism.

FIG. 1 illustrates a call between functions which may be optimized with the present technology. The language and representation used as appreciated by the person skilled in the art is that of pseudo-code, not specific to any programming language, yet reflecting a particular architecture. A function 101 calls (104) a function 102, which in turn calls (105) a function 103. An illustrated assumption is that the processor in this environment may consume a Register File 100, comprising 64 registers, numbered R0 to R63.

Further illustrated assumptions regarding function 101 are: it (i) uses a total of 62 registers R0 to R61 (as represented with 106), (ii) uses 21 live registers R0 to R20 at Callsite for function 102, and (iii) has a value of "0" in R0. "Live registers" herein defines registers in which a data value is stored which is needed by a function after having invoked/called a lower level function.

Function 101 involves a number of instructions using R0 to R20. Then, before a call (104) is made to function 102: (i) the value read from R0 may be added to a value of "21" (number of used live registers at Callsite, a constant for a compiler (not represented), or immediate value that may be encoded directly in an instruction), and the result may be stored in R21 (instruction: R21=R0+21=21), and (ii) a special instruction (Set Rel_Index=R21) allows to pass on to function 102 a relative index/offset that the hardware may use to offset the physical location of registers used by function 102 (represented as 107) relative to the Register File 100.

Returning from function 102, the value may be read from R0 which at this point is still the R0 used for/by function 102 (because the relative index is still that as set by the preceding instruction: Set Rel_Index=R21) with a value of 21, and "21" (number of used live registers at Callsite) may be subtracted from that value. The relative index may be in fact restored to its value prior to the call 104. Then function 101 may run instructions using R21 to R61.

A number of registers used by function 101, $Nof\_reg_{101}$, may be calculated as the minimum between "64" (number of registers in Register File 100) and the maximum between "62" (62 registers used by function 101) and a number that depends, as explained below, on the registers used by functions down the call chain from function 101.

Regarding function 102, further illustrated assumptions are: it (i) uses a total of 31 registers R0 to R30 (as represented with 107), and (ii) uses 11 live registers R0 to R10 at Callsite for function 103. Through the Set Rel_Index=R21 instruction in function 101, the value of R0 may be "21".

Function 102 involves a number of instructions using R0 to R10. Then, before a call (105) is made to function 103: (i) the value read from R0 may be added to a value of "11" (number of used live registers at Callsite, a constant for the compiler, or immediate value that may be encoded directly in an instruction), and the result may be stored in R11 (instruction: R11=R0+11=32), and (ii) the special instruction (Set Rel_Index=R11) allows to pass on to function 103 a relative index/offset that the hardware may use to offset the physical location of registers used by function 103 (represented as 108) relative to the Register File 100.

Returning from function 103, the value may be read from R0 which at this point is still the R0 used for/by function 103 (because the relative index is still that as set by the preceding instruction: Set Rel_Index=R11) with a value of 11, and "11" (number of used live registers at Callsite) may be subtracted from that value. The relative index may be in fact restored to its value prior to the call 105. Then function 102 may run instructions using R11 to R30.

A number of registers used by function 102, $Nof\_reg_{102}$, may be calculated as the minimum between "64" (number of registers in Register File 100) and the maximum between "31" (31 registers used by function 102) and a number that depends, as explained below, on the registers used by functions down the call chain from function 102.

Regarding function 103, further illustrated assumptions are: it (i) uses a total of 27 registers R0 to R26 (as represented with 108), and (ii) does not call any other function down the call chain. Thus a number of registers used by function 103, $Nof\_reg_{103}$, may be calculated as "27", which allows in turn to calculate $Nof\_reg_{102}$ and $Nof\_reg_{101}$.

Thus, physical registers R21 to R61 from Register File 100 are optimally used for consumption by functions 102 and 103.

Figure 2:
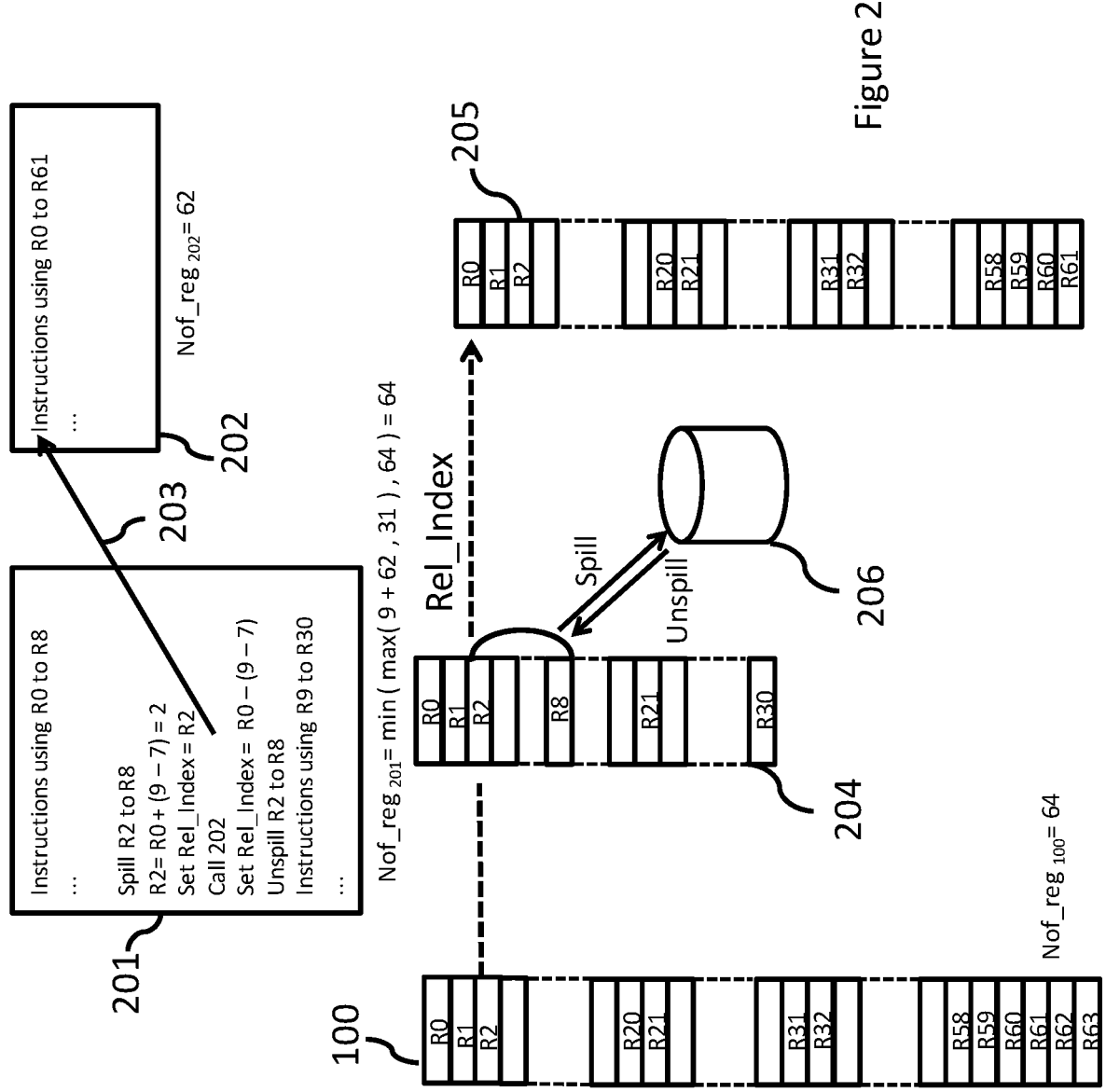
FIG. 2 illustrates a top-level function making a call to functions which may be optimized with the present technology.

FIG. 2 illustrates a top-level function making a call to functions which may be optimized with the present technology, in the same processing environment of a Register File 100, comprising 64 registers.

Illustrated assumptions regarding top-level function 201 are: it (i) uses a total of 31 registers R0 to R30 (as represented with 204), (ii) uses 9 live registers R0 to R8 at Callsite for function 202, and (iii) has a value of "0" in R0. Regarding a called function 202, further illustrated assumptions are: it uses a total of 62 registers R0 to R61 (as represented with 205).

Function 201 involves a number of instructions using R0 to R8. Then, at a call (203) made to function 202: a compiler (not represented) may conduct interprocedural analysis and have a view of register needs by all functions, and thus may know at Callsite in top-level function 201, that (i) function 202 is the only possible call target, (ii) 9 live registers are required by function 201, and (iii) $Nof\_reg_{202}=62$. The sum 9+62=71 is higher than the total number of available registers in Register File 100 ($Nof\_reg_{100}=64$), and thus, a need to spill 7 registers before the call 203 arises. A top-level function 201 runtime spill check may then be the comparison between the values of:

$$[Nof\_live\ reg_{201}+R0+Nof\_reg_{202}]\ vs\ Nof\_reg_{100}$$

and a compiler may dynamically generate spill for 7 registers R2 to R8 before the call 203. The spill may be to a Cache/Memory 206.

The spilled registers may be the 7 consecutive registers immediately preceding the last of the live registers R8, i.e. function 201 may spill registers R2 to R8. Next, (i) the value read from R0 may be added to a value of "9−7" (a constant for the compiler, or immediate value that may be encoded directly in an instruction: number of used live registers at Callsite, minus number of spilled registers), the result may be stored in what becomes the next available register after the spill, i.e. R2 (instruction: R2=R0+(9−7)=2), and (ii) the special instruction (Set Rel_Index=R2) allows to pass on to function 202 a relative index/offset that the hardware may use to offset the physical location of registers used by function 202 (represented as 205) relative to the Register File 100.

Returning from function 202, the value may be read from R0 which at this point is still the R0 used for/by function 202 (because the relative index is still that as set by the preceding instruction: Set Rel_Index=R2) with a value of 2, and "9−7" (number of used live registers at Callsite minus number of spilled registers) may be subtracted from that value. The relative index may be in fact restored to its value prior to the call 203. Then function 201 may run instructions using R9 to R30.

A number of registers used by function 201 $Nof\_reg_{201}$ may be calculated as the minimum between "64" (number of registers in Register File 100) and the maximum between "9+62" (9 live registers used by function 201, plus 62 registers used by function 202) and "31" (number of registers used by function 201).

The compiler may then Unspill from the Cache/Memory 206 registers R2 to R8 back into Register file 100. In this way, with the present technology, just the right amount of spill/unspill may be generated. The compiler may check the numbers of any temporary or local registers dead at Callsite, and re-use them for the callee by dynamically setting relative index for callee.

Figure 3:
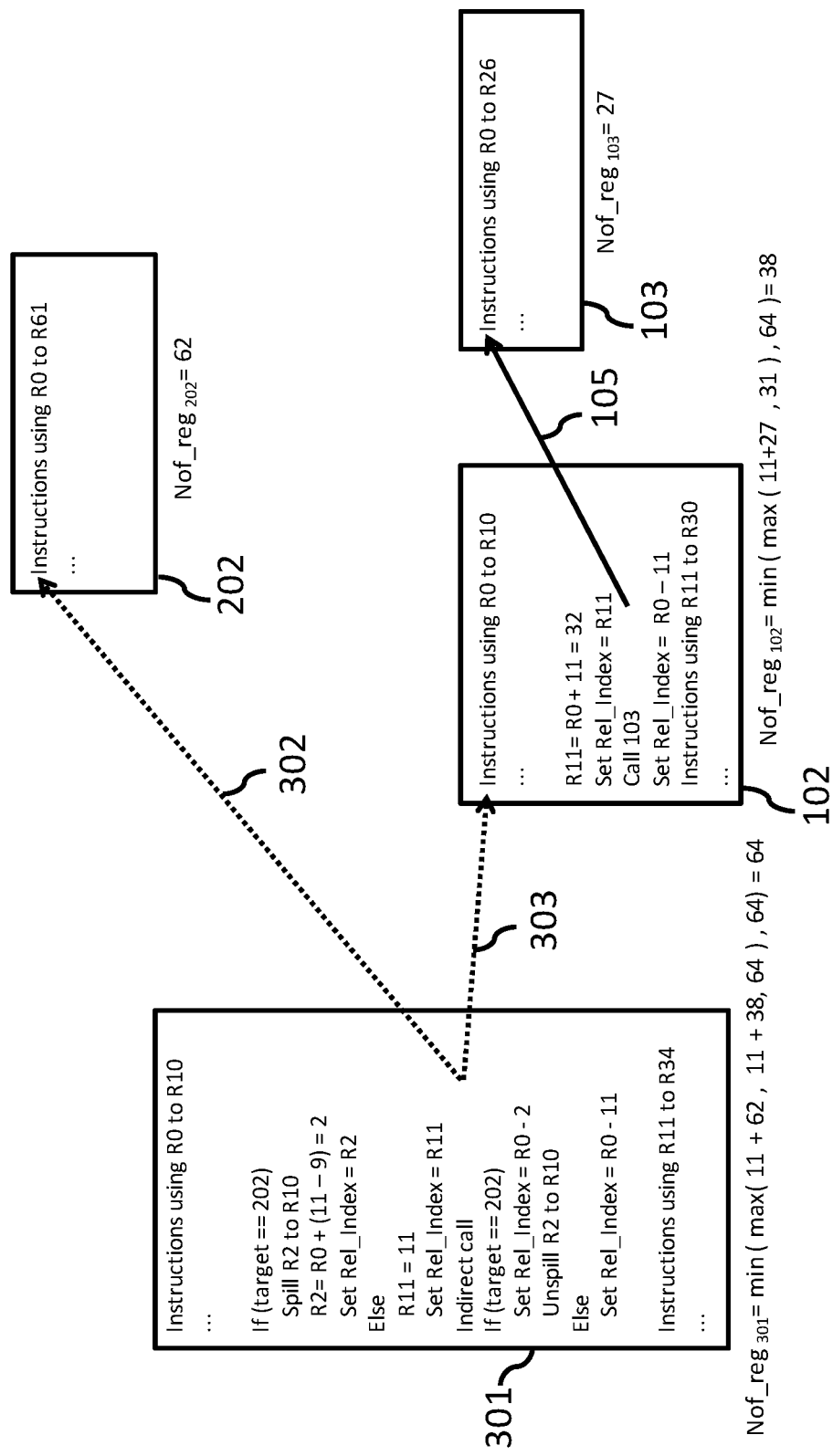
FIG. 3 illustrates a top-level function making an indirect call where the actual target function may be one of several which may be optimized with the present technology.

FIG. 3 illustrates a top-level function making an indirect call where the actual target function may be one of several. With assumptions as, unless otherwise mentioned, in FIGS. 1 and 2, Callsite in a top-level function 301 may have two possible targets, and an indirect call 302 may be made to the function 202, or 303 to the function 102.

Illustrated assumptions regarding top-level function 301 are: it (i) uses a total of 35 registers R0 to R34, (ii) uses 11 live registers R0 to R10 at Callsite for indirect call to one of functions 202 or 102, and (iii) has a value of "0" in R0. Regarding potentially called functions 202 and 102, further assumptions are as illustrated in FIGS. 1 and 2.

Function 301 involves a number of instructions using R0 to R10. Then, before an indirect call (302, 303): a compiler (not represented) may conduct interprocedural analysis and have a view that either function 202 or 102 may be called, with associated likelihood or % of being called, that function 103 may be called by function 102, and also of all register needs by all functions, and thus may know at Callsite in top-level function 301, that (i) 11 live registers are required by function 301, (ii) $Nof\_reg_{202}=62$, and (iii) $Nof\_reg_{102}=38$.

Compiler may thus generate code that checks for all possible call target functions, and determine any need for spilling registers depending on actual target, by comparing respectively: [Nof_live reg$_{301}$+R0+Nof_reg$_{202}$] vs Nof_reg$_{100}$ for call 302, and [Nof_live reg$_{301}$+R0+Nof_reg$_{102}$] vs Nof_reg$_{100}$ for call 303.

The compiler may accordingly generate code that both spills registers and sets the relative index depending on the target function:

if target is function 202: the sum [Nof_live reg$_{301}$+R0+Nof_reg$_{202}$] is 11+0+62, higher than the number of registers in Register File 100; in this case, 73−64=9 registers need be spilled. The compiler may dynamically generate spill for 9 registers R2 to R10. The spill may be to the Cache/Memory 206. Next, the value read from R0 may be added to a value of "11−9" (a constant for the compiler, or immediate value that may be encoded directly in an instruction: number of used live registers at Callsite, minus number of spilled registers), the result may be stored in what becomes the next available register after the spill, i.e. R2 (instruction: R2=R0+(11−9)=2), and (ii) the special instruction (Set Rel_Index=R2) allows to pass on to function 202, if called, a relative index/offset that the hardware may use to offset the physical location of registers used by function 202 relative to the Register File 100;

if target is function 102: the sum [Nof_live reg$_{301}$+R0+Nof_reg$_{102}$] is 11+0+38, lower than the number of registers in Register File 100; in this case, no registers need be spilled. Next, (i) the value of "11" (number of used live registers at Callsite, a constant for the compiler, or immediate value that may be encoded directly in an instruction) may be input in R11, and (ii) the special instruction (Set Rel_Index=R11) allows to pass on to function 102, if called, a relative index/offset that the hardware may use to offset the physical location of registers used by function 102 relative to the Register File 100.

Compiler may thus spill registers depending on the actual target and its use of registers, and spill only the minimum number of registers. Spilling is optimized, and optimal spilling code adapted per target.

Returning from the indirect call:

if returning from function 202: the value may be read from R0 which at this point is still the R0 used for/by function 202 (because the relative index is still that as set by the preceding instruction: Set Rel_Index=R2) with a value of 2, and "11−9" (number of used live registers at Call site minus number of spilled registers) may be subtracted from that value. The relative index may be in fact restored to its value prior to the call 302. The compiler may then Unspill from the Cache/Memory 206 registers R2 to R10 back into Register file 100;

if returning from function 102: the value may be read from R0 which at this point is still the R0 used for/by function 102 (because the relative index is still that as set by the preceding instruction: Set Rel_Index=R11) with a value of 11, and "11" (number of used live registers at Callsite) may be subtracted from that value. The relative index may be in fact restored to its value prior to the call 303;

then function 301 may run instructions using R11 to R34. In this way, with the present technology, just the right amount of spill may be generated.

In the foregoing examples and figures, it has been assumed that functions 101, 201 and 301 had a value of "0" in R0, indicative of functions 101, 201 and 301 being respectively top-level functions. More generally it has been assumed that at compile time for a given function, the compiler could have through, for example, interprocedural analysis, for each analyzed function, knowledge of the value of R0, or of the relative index for that function, or of the level (top-level or other level) for that function. There may however be cases when at compile time, the compiler may not be able to have access to, or deduce, that knowledge.

Figure 4:
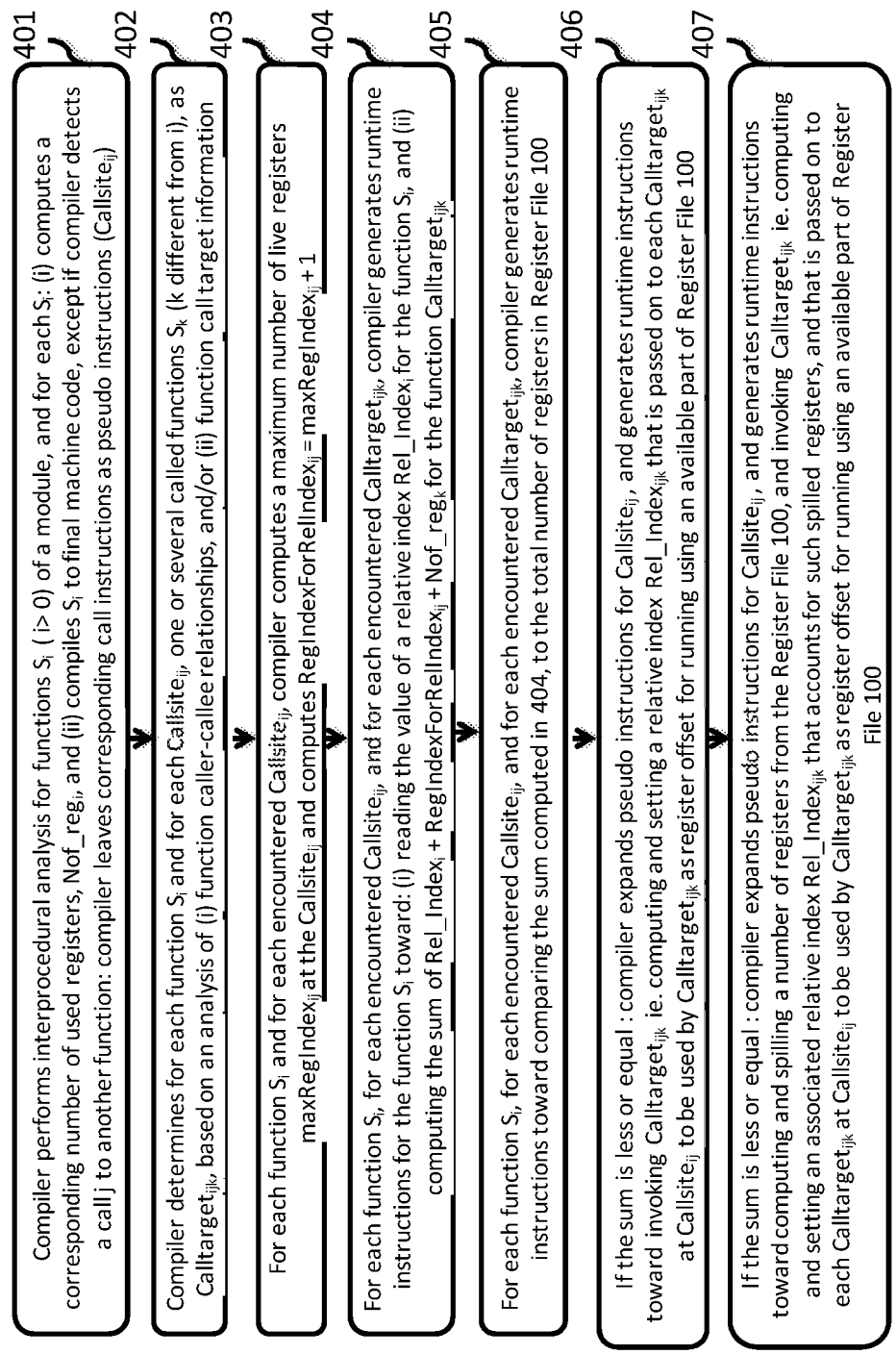
FIG. 4 depicts method steps by a compiler according to the present technology.

FIG. 4 depicts method steps by a compiler (not represented) according to the present technology, in the general case when the compiler for an analyzed function does not have access to that knowledge, in particular is not able to determine at compile time that the value of R0 for a function is "0" (case of top-level function), or more generally to determine the value of a relative index in R0 (case of a called function). The hardware environment is that of Register File 100 comprising a limited number of registers, Nof_reg$_{file}$.

At step 401, the compiler may perform interprocedural analysis within the module, and for all function S$_i$ of the module: (i) computes a corresponding number of registers Nof_reg$_i$ used by that function S$_i$, and (ii) compiles the function S$_i$ to final machine code, except that if the compiler detects in the function S$_i$ a call j to another function: the compiler leaves corresponding call instructions as pseudo instructions (Callsite$_{ij}$) to be expanded to final machine code in later steps.

For a leaf function, i.e. a function with no calls, Nof_reg$_i$ is simply the largest register index used by the function+1. For example, if a leaf function f uses registers R0 to R35, Nof_reg$_f$=35+1=36. For a non-leaf function n, for each Callsite c in n, RegIndex$_c$ may be computed as maxRegIndex$_{nc}$+1, where maxRegIndex$_{nc}$ is the largest register index used by non-leaf function n at Callsite c. For each Callsite c in n, and for each call target t of c, the compiler may compute the number of registers required for t as: Nof_reg$_{tc}$=RegIndex$_c$+Nof_reg$_t$. Nof_reg$_n$ is defined as min (Nof_reg$_{file}$, max(Nof_reg$_{tc}$, RegIndex$_n$)).

In one embodiment of the present technology, the compiler may utilize interprocedural analysis to compute Nof_reg$_i$ for functions in a certain order; for example, by computing leaf functions first, and iteratively moving up the call chain to caller functions in the caller-callee relationship graph. In another embodiment, compiler may compute Nof_reg$_i$ on demand, and consult interprocedural analysis result to obtain call targets. If call target information for a Callsite$_{ij}$ is unknown, compiler may simply return Nof_reg$_{file}$ as a conservative estimation.

At step 402, the compiler determines for each function S$_i$ and for each Callsite$_{ij}$, one or several called functions other than S$_i$, as Calltarget$_{ijk}$, based on an analysis of (i) function caller-callee relationships, and/or (ii) function call target information.

At step 403, for each function S$_i$ and for each encountered Callsite$_{ij}$, the compiler computes a maximum number of live registers maxRegIndex$_{ij}$ at the Callsite$_{ij}$. This maximum number is the largest register index along any execution path from the start of function S$_i$, to Callsite$_{ij}$. For example, in FIG. 1, it is R20 for function 106. Compiler further computes RegIndexForRelIndex$_{ij}$: RegIndexForRelIndex$_{ij}$=maxRegIndex$_{ij}$+1.

At step 404, for each function S$_i$, for each encountered Callsite$_{ij}$, and for each encountered Calltarget$_{ijk}$, the compiler expands pseudo call instructions and generates runtime instructions for the function S$_i$ toward: (i) reading the value of a relative index Rel_Index$_i$ for the function S$_i$ in R0, and (ii) computing the sum of: RegIndexForRelIndex$_{ij}$, Rel_Index$_i$, and the number of registers Nof_reg$_k$ used by the function Calltarget$_{ijk}$.

At step 405, for each function S$_i$, for each encountered Callsite$_{ij}$, and for each encountered Calltarget$_{ijk}$, the compiler generates runtime instructions toward comparing the sum computed at step 404, to the total number of registers in Register File 100, $\text{Nof\_reg}_{file}$.

At step 406, if the sum computed at step 404 is less than, or equal to, the total number of registers in Register File 100, $\text{Nof\_reg}_{file}$, the compiler expands pseudo call instructions with runtime instructions toward computing and setting a relative index $\text{Rel\_Index}_{ijk}$ that is passed on to each Calltarget$_{ijk}$ at Callsite$_{ij}$ to be used by the function Calltarget$_{ijk}$ as register offset for running using an available part of Register File 100.

In an embodiment of the technology, this may be realized by runtime instructions that perform: (i) computing: $\text{Rel\_Index}_{ijk}=\text{R0}+\text{RegIndexForRelIndex}_{ij}$ where R0 holds the Rel_Index$_i$ for function S$_i$, (ii) storing the value Rel_Index$_{ijk}$, in register indexed at RegIndexForRelIndex$_{ij}$ i.e. $R_{RegIndexForRelIndexij}$; if required, other parameters may be set at $R_{RegIndexForRelIndexij+1}$, $R_{RegIndexForRelIndexij+2}$ etc, (iii) generating an instruction: Set Rel_index$_k$=$R_{RegIndexForRelIndexij}$ to set the new relative index for S$_k$, (iv) generating the call instruction, and (v) generating the instruction: R0=R0–$R_{RegIndexForRelIndexij}$ to reset R0 value back to the previous value for S$_i$, and the instruction: Set Rel_index$_i$=R0 to reset the relative index for S$_i$.

At step 407, if the sum computed at step 404 is higher than the total number of registers in Register File 100, $\text{Nof\_reg}_{file}$, the compiler expands pseudo call instructions with runtime instructions for the function S$_i$ toward computing and spilling a number of registers from the Register File 100, and invoking Calltarget$_{ijk}$ ie. computing and setting an associated relative index Rel_Index$_{ijk}$ that accounts for such spilled registers, and that is passed on to each Calltarget$_{ijk}$ at Callsite$_{ij}$ to be used by Calltarget$_{ijk}$ as register offset for running using an available part of Register File 100.

In an embodiment of the technology, this may be realized by runtime instructions that perform: (i) generating instructions to compute the number of registers to spill NSpill$_{ij}$ from the Register File 100, and an associated relative index Rel_Index$_{ijk}$ that is passed on to Calltarget$_{ijk}$ at Callsite$_{ij}$ to be used by Calltarget$_{ijk}$ as register offset for running using an available part of register file 100: NSpill$_{ij}$=(Nof_reg$_{file}$–(R0+RegIndexForRelIndex$_{ij}$+Nof_reg$_k$), (ii) generating spill instructions that save these NSpill$_{ij}$ registers, first the instruction: Set Rel_index$_i$=Rel_index$_{ijk}$ to first adjust the relative index, and then spill R0, R1 . . . to $R_{NSillij-1}$, (iii) generating instructions that store value Rel_index$_{ijk}$ in R0, and store value (RegIndexForRelIndex$_{ij}$–NSpill$_{ij}$) in R1. The value in R1 may be used as an additional parameter to indicate how callee's relative index has shifted compared to caller's relative index, (iv) generating the call instruction, (v) generating an instruction: $R_{free}$=R0+R1 to compute Rel_Index$_i$ and save it in a free register, as R0 and R1 will be overwritten after unspill, (vi) generating unspill instructions that restore NSpill$_{ij}$ registers starting from register indexed at R0, and (vii) generating an instruction: Set Rel_index$_i$=$R_{free}$ to reset the relative index for S$_i$ to Rel_Index$_i$.

In relation to the foregoing (i): NSpill$_{ij}$ is a runtime value which may be larger than RegIndexForRelIndex$_{ij}$. This means in addition to saving all live registers at Callsite$_{ij}$ in S$_i$, some live registers from up the call chain may also be saved. The range of registers to be spilled may thus start from physical register indexed at Rel_index$_{ijk}$=(R0+RegIndexForRelIndex$_{ij}$–NSpill$_{ij}$) for NSpill$_{ij}$ registers.

Figure 5:
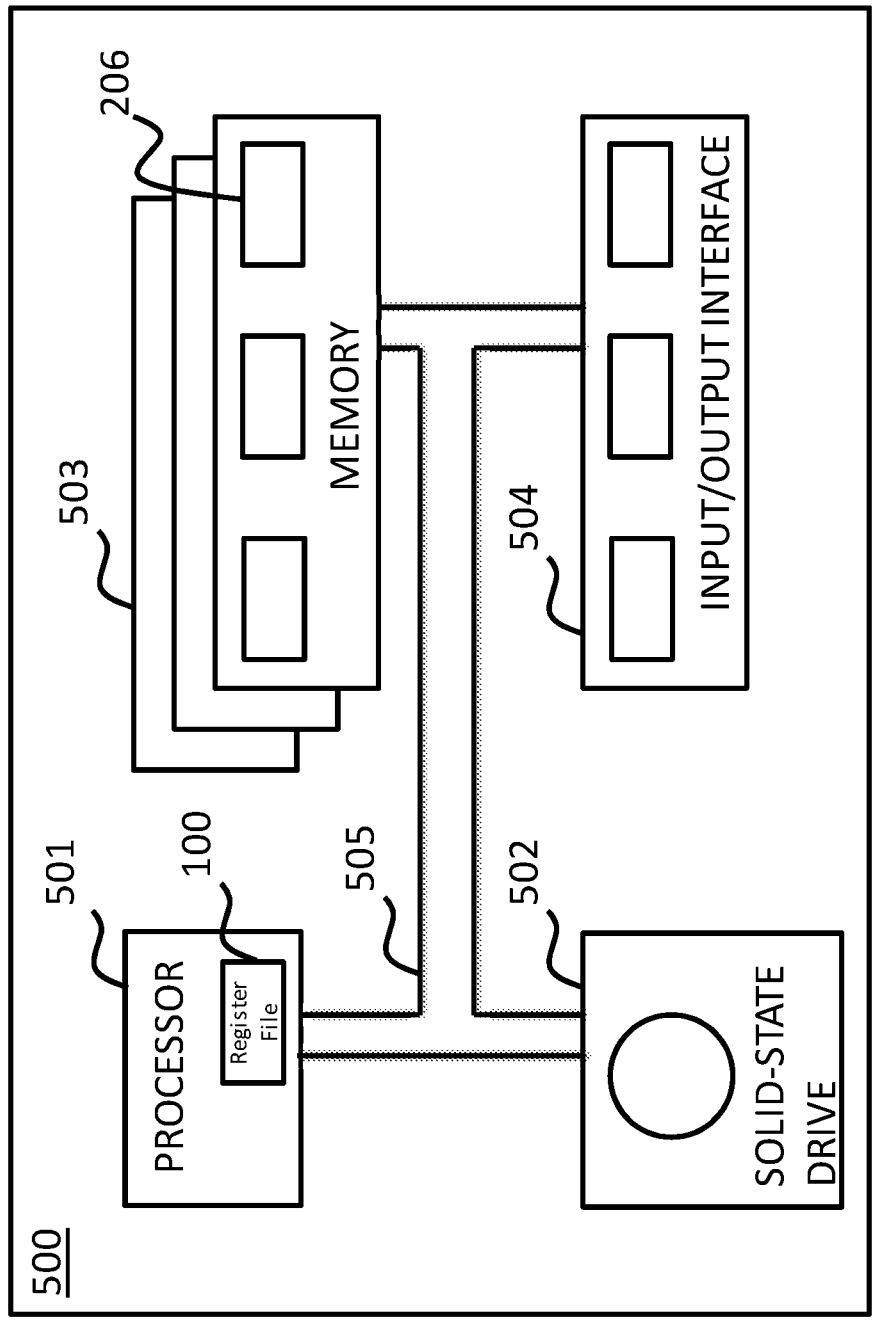
FIG. 5 depicts a computing system in which the method and process steps described herein may be implemented.

When at compile time for a given function, the compiler has through, for example, interprocedural analysis, for each analyzed function, knowledge of the value of R0, or of the relative index for that function, or of the level (top-level or other level) for that function, then certain computation such as checking for spill in the foregoing steps can be performed at compile time rather than runtime with compiler-generated instructions. In FIG. 1, for example, if compiler obtains knowledge that R0 holds a certain value or has an upper limit, the check in step 405 can be performed at compile time. If the check indicates no spill will occur, the compiler does not generate any spill instructions The method and process steps described above, and the compiler (not represented) may be implemented in a computing system, of which an example, without limitation, may be found in relation to FIG. 5. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the computing system 500 may comprise various hardware components including one or more single or multi-core processors collectively represented by a processor 501, a solid-state drive 502, a memory 503 and an input/output interface 504. In this context, the processor 501 may or may not be included in a FPGA. In some other aspects, the computing system 500 may be an "off the shelf" generic computing system. In some aspects, the computing system 500 may also be distributed amongst multiple systems. The computing system 500 may also be specifically dedicated to the implementation of the present technology. As a person in the art of the present technology may appreciate, multiple variations as to how the computing system 500 is implemented may be envisioned without departing from the scope of the present technology.

The processor 501 may include the Register File 100. In some aspects, the Register File 100 may also be included in memory 503, or distributed amongst multiple systems.

Communication between the various components of the computing system 500 may be enabled by one or more internal and/or external buses 505 (e.g. a PCI bus, universal serial bus, IEEE 1394 "Firewire" bus, SCSI bus, Serial-ATA bus, ARINC bus, etc.), to which the various hardware components are electronically coupled. [78] The input/output interface 504 may allow enabling networking capabilities such as wire or wireless access. As an example, the input/output interface 504 may comprise a networking interface such as, but not limited to, a network port, a network socket, a network interface controller and the like. Multiple examples of how the networking interface may be implemented will become apparent to the person skilled in the art of the present technology. According to implementations of the present technology, the solid-state drive 502 may store program instructions, such as those part of, for example, a library, an application, etc. suitable for being loaded into the memory 503 and executed by the processor 501 for the method and process steps according to the present technology.

The memory 503 may include the Cache/Memory 206. In some aspects, the Cache/Memory 206 may also be included in processor 501, or distributed amongst multiple systems.

In this environment, each function S$_i$ executes using its own relative index passed in its register R0, by a calling function as the case may be, as a register offset for running using an available part of Register File 100. In one embodiment of the present technology, as a side effect of executing the set Rel_Index instruction, the value of the relative index may be stored in a hardware register that is not part of Register File 100. The currently active relative index may be read via this hardware register. In such embodiment, it is not required to pass the current relative index as an argument in R0, as it may always be read from the hardware register.

It is to be understood that the operations and functionality of the disclosed methods and apparatuses may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. Method for optimizing by a compiler register resource allocation for a function $S_i$ of a module, i>0, using a Register File comprising a number of registers, $Nof\_reg_{file}$, the method comprising:
 performing interprocedural analysis in the module, and:
 computing the number of registers used by the function $S_i$, $Nof\_reg_i$; and
 compiling the function $S_i$ to a final machine code, wherein if the compiler detects a call j, j<>i, to another function $S_j$, the compiler leaves call instructions as pseudo instructions, $Callsite_{ij}$;
 for each $Callsite_{ij}$:
 determining one or several called functions $S_k$, k<>i, as $Calltarget_{ijk}$; and
 computing a maximum number of live registers used by function $S_i$ at the $Callsite_{ij}$, $maxRegIndex_{ij}$, and computing $RegIndexForRelIndex_{ij}=maxRegIndex_{ij}+1$;
 for each $Callsite_{ij}$ and each $Calltarget_{ijk}$, expanding the call instructions to the final machine code toward:
 reading a value of a relative index $Rel\_Index_i$ for the function $S_i$, and computing a sum of $Rel\_Index_i+RegIndexForRelIndex_{ij}+Nof\_reg_k$ for the function $Calltarget_{ijk}$; and
 comparing the computed sum to $Nof\_reg_{file}$, wherein
 if the computed sum is less than, or equal to $Nof\_reg_{file}$, computing and setting a relative index $Rel\_Index_{ijk}$ that is passed on to each $Calltarget_{ijk}$ at $Callsite_{ij}$ to be used by $Calltarget_{ijk}$ as register offset for running using an available part of the Register File; and
 otherwise, computing and spilling registers from the Register File, and computing and setting an associated relative index $Rel\_Index_{ijk}$ that accounts for the spilled registers, and that is passed on to each $Calltarget_{ijk}$ at $Callsite_{ij}$ to be used by $Calltarget_{ijk}$ as register offset for running using an available part of the Register File; and
 repeating the computing, compiling, determining, computing, reading, comparing, computing and spilling and setting for all functions $S_i$ of the module.

2. The method of claim 1 wherein functions $S_i$ are shader functions performing raytracing in a Graphical Processing Unit, GPU.

3. The method of claim 1 wherein the performing interprocedural analysis in the module involves an analysis of at least one of (i) caller-callee relationships between functions $S_i$, or (ii) function $S_k$ call target information.

4. The method of claim 1 wherein the compiler uses profiling information in addition to performing interprocedural analysis.

5. The method of claim 1 wherein the relative index $Rel\_Index_{ijk}$ is passed on by writing it to a register R0 of the $Calltarget_{ijk}$.

6. The method of claim 1 wherein the relative index $Rel\_Index_{ijk}$ is passed on to the $Calltarget_{ijk}$ by writing it in a processor register that is not part of the Register File, and fetching it in such register by the $Calltarget_{ijk}$.

7. The method of claim 3 when performing interprocedural analysis in the module involves an analysis of caller-callee relationships between functions $S_i$, wherein the computing the number of registers $Nof\_reg_i$ used by the functions $S_i$ is performed by:
 computing $Nof\_reg_i$ for each leaf function among the functions $S_i$, and
 for each leaf function, iteratively computing $Nof\_reg_i$ for each function moving up the call chain among the functions $S_i$ that are in a caller-callee relationship with the leaf function.

8. The method of claim 3 when performing interprocedural analysis in the module involves an analysis of function $S_k$ call target information, wherein the computing the number of registers $Nof\_reg_i$ used by the functions $S_i$ is performed on demand, and if the call target information for a Callsiteij is unknown, compiler returns $Nof\_reg_i$ as $Nof\_reg_{file}$.

9. The method of claim 1, wherein the computing and setting a relative index $Rel\_Index_{ijk}$ that is passed on to each $Calltarget_{ijk}$ at $Callsite_{ij}$ in the case the computed sum is less than, or equal to $Nof\_reg_{file}$, comprises expanding the call instructions to the final machine code toward:
 computing: a value of $Rel\_Index_{ijk}=R0+RegIndexForRelIndex_{ij}$ where R0 holds the $Rel\_Index_i$ for function $S_i$;
 storing the value of $Rel\_Index_{ijk}$ in register indexed at $RegIndexForRelIndex_{ij}$, $R_{RegIndexForRelIndexij}$;
 setting: $Rel\_index_k=R_{RegIndexForRelIndexij}$;
 calling $S_k$;
 computing: $R0=R0-R_{RegIndexForRelIndexij}$; and
 setting: $Rel\_index_i=R0$.

10. The method of claim 1, wherein the computing and setting a relative index $Rel\_Index_{ijk}$ that is passed on to each $Calltarget_{ijk}$ at $Callsite_{ij}$ in the case the computed sum is more than $Nof\_reg_{file}$, comprises expanding the call instructions to the final machine code toward:
 computing a number of registers to spill $NSpill_{ij}$ from the Register File: $NSpill_{ij}=(Nof\_reg_{file}-(R0+RegIndexForRelIndex_{ij}+Nof\_reg_k)$;
 setting: $Rel\_index_i=Rel\_index_{ijk}$;
 spilling registers R0 to $R_{NSpillij-1}$;
 storing $Rel\_index_{ijk}$ in R0, and $(RegIndexForRelIndex_{ij}-NSpill_{ij})$ in R1;
 calling $S_k$;
 computing: $R_{free}=R0+R1$, and storing $R_{free}$ in a register other than R0 or R1;
 unspilling registers R0 to $R_{NSpillij-1}$; and
 setting: Set $Rel\_index_i=R_{free}$.

11. An apparatus comprising a processor, a Register File comprising a number of registers, $Nof\_reg_{file}$, and a Memory, the processor running a compiler configured to compile a module comprising functions S to processor executable instructions, wherein the compiler is further configured to optimize register resource allocation for a function $S_i$ of the module, i>0, the optimizing comprising:
 performing interprocedural analysis in the module, and:

computing the number of registers used by the function $S_i$, $Nof\_reg_i$; and compiling the function $S_i$ to processor executable instructions, wherein if the compiler detects a call j, j<>i, to another function $S_j$, the compiler leaves call instructions as pseudo instructions, $Callsite_{ij}$;

for each $Callsite_{ij}$:

determining one or several called functions $S_k$, k<>i, as $Calltarget_{ijk}$; and computing a maximum number of live registers used by function $S_i$ at the $Callsite_{ij}$, $maxRegIndex_{ij}$, and computing $RegIndexForRelIndex_{ij}=maxRegIndex_{ij}+1$;

for each $Callsite_{ij}$ and each $Calltarget_{ijk}$, expanding the call instructions to processor executable instructions toward:

reading a value of a relative index $Rel\_Index_i$ for the function $S_i$, and computing a sum of $Rel\_Index_i + RegIndexForRelIndex_{ij} + Nof\_reg_k$ for the function $Calltarget_{ijk}$; and comparing the computed sum to $Nof\_reg_{file}$, wherein if the computed sum is less than, or equal to $Nof\_reg_{file}$, computing and setting a relative index $Rel\_Index_{ijk}$ that is passed on to each $Calltarget_{ijk}$ at $Callsite_{ij}$ to be used by $Calltarget_{ijk}$ as register offset for running using an available part of the Register File; and otherwise, computing and spilling registers from the Register File to the Memory, and computing and setting an associated relative index $Rel\_Index_{ijk}$ that accounts for the spilled registers, and that is passed on to each $Calltarget_{ijk}$ at $Callsite_{ij}$ to be used by $Calltarget_{ijk}$ as register offset for running using an available part of the Register File; and repeating the computing, compiling, determining, computing, reading, comparing, computing and spilling and setting for all functions $S_i$ of the module.

12. The apparatus of claim 11 wherein the processor is a Graphical Processing Unit, GPU, and the functions $S_i$ are shader functions performing raytracing.

13. The apparatus of claim 11 wherein the relative index $Rel\_Index_{ijk}$ is passed on by writing it to a register R0 of the $Calltarget_{ijk}$.

14. The apparatus of claim 11 wherein the relative index $Rel\_Index_{ijk}$ is passed on to the $Calltarget_{ijk}$ by writing it in a register in the processor that is not part of the Register File, and fetching it in such register by the $Calltarget_{ijk}$.

15. A non-transitory computer readable medium with computer executable instructions stored thereon that, when executed by a processor, cause the processor to optimize register resource allocation for a function $S_i$ of a module, i>0, using a Register File comprising a number of registers, $Nof\_reg_{file}$, the optimizing comprising:

performing interprocedural analysis in the module, and:

computing the number of registers used by the function $S_i$, $Nof\_reg_i$; and compiling the function $S_i$ to a final machine code, wherein if the compiler detects a call j, j<>i, to another function $S_j$, the compiler leaves call instructions as pseudo instructions, $Callsite_{ij}$;

for each $Callsite_{ij}$:

determining one or several called functions $S_k$, k<>i, as $Calltarget_{ijk}$; and computing a maximum number of live registers used by function $S_i$ at the $Callsite_{ij}$, $maxRegIndex_{ij}$, and computing $RegIndexForRelIndex_{ij}=maxRegIndex_{ij}+1$;

for each $Callsite_{ij}$ and each $Calltarget_{ijk}$, expanding the call instructions to the final machine code toward:

reading a value of a relative index $Rel\_Index_i$ for the function $S_i$, and computing a sum of $Rel\_Index_i + RegIndexForRelIndex_{ij} + Nof\_reg_k$ for the function $Calltarget_{ijk}$; and comparing the computed sum to $Nof\_reg_{file}$, wherein if the computed sum is less than, or equal to $Nof\_reg_{file}$, computing and setting a relative index $Rel\_Index_{ijk}$ that is passed on to each $Calltarget_{ijk}$ at $Callsite_{ij}$ to be used by $Calltarget_{ijk}$ as register offset for running using an available part of the Register File; and otherwise, computing and spilling registers from the Register File, and computing and setting an associated relative index $Rel\_Index_{ijk}$ that accounts for the spilled registers, and that is passed on to each $Calltarget_{ijk}$ at $Callsite_{ij}$ to be used by $Calltarget_{ijk}$ as register offset for running using an available part of the Register File; and repeating the computing, compiling, determining, computing, reading, comparing, computing and spilling and setting for all functions $S_i$ of the module.

16. The non-transitory computer readable medium of claim 15 wherein the performing interprocedural analysis in the module involves an analysis of at least one of (i) caller-callee relationships between functions $S_i$, or (ii) function $S_k$ call target information.

17. The non-transitory computer readable medium of claim 15 wherein the compiler uses profiling information in addition to performing interprocedural analysis.

* * * * *